United States Patent [19]

Ueda

[11] Patent Number: 4,774,429
[45] Date of Patent: Sep. 27, 1988

[54] ROTOR FOR A SUPERCONDUCTING ROTATING ELECTRIC MACHINE

[75] Inventor: Akinori Ueda, Kobe, Japan

[73] Assignee: Mitsubishi Denki Kabushiki Kaisha, Japan

[21] Appl. No.: 94,089

[22] Filed: Sep. 4, 1987

Related U.S. Application Data

[63] Continuation of Ser. No. 924,876, Oct. 30, 1986, abandoned.

[30] Foreign Application Priority Data

Nov. 5, 1985 [JP] Japan ................... 60-247359
Nov. 5, 1985 [JP] Japan ................... 60-247360
Nov. 5, 1985 [JP] Japan ................... 60-247361
Nov. 5, 1985 [JP] Japan ................... 60-247362

[51] Int. Cl.$^4$ ............................................. H02K 3/48
[52] U.S. Cl. .................................... 310/214; 310/43; 310/45; 310/52; 310/261
[58] Field of Search ............... 310/40 R, 10, 52, 58, 310/59, 108, 64, 41, 43, 45, 214, 215, 261; 336/197

[56] References Cited

U.S. PATENT DOCUMENTS

| | | | |
|---|---|---|---|
| 3,679,926 | 7/1972 | Simmonds et al. | 310/215 X |
| 4,282,450 | 8/1981 | Eckels | 310/215 X |
| 4,318,020 | 3/1982 | Meyer | 310/215 |
| 4,385,248 | 5/1983 | Laskaris | 310/215 X |
| 4,439,701 | 3/1984 | Okamoto et al. | 310/52 X |
| 4,642,503 | 1/1987 | Ueda et al. | 310/52 X |
| 4,649,303 | 3/1987 | Hirao | 310/52 |
| 4,658,170 | 4/1987 | Ueda | 310/52 X |

FOREIGN PATENT DOCUMENTS 51-100205 9/1976 Japan .
56-56168 5/1981 Japan .
57-166838 10/1982 Japan .

*Primary Examiner*—R. Skudy
*Attorney, Agent, or Firm*—Leydig, Voit & Mayer

[57] ABSTRACT

A rotor for a superconducting rotating electric machine has pre-wound rotor coils housed in longitudinally-extending slots formed in a coil-carrying shaft. Each coil is restrained against circumferential forces by a plurality of rigid restraining members which are inserted between one side of the coil and the side of the slot in which the coil is housed. The restraining members are disposed on top of one another in layers corresponding to the number of layers in the coils. Preferably, they are made of an electrically-insulating material. A plurality of longitudinally-aligned restraining members may be employed for each layer of the coil. The restraining members for each layer may be disposed with gaps left therebetween in the longtudinal direction and packings disposed in the gaps.

8 Claims, 8 Drawing Sheets

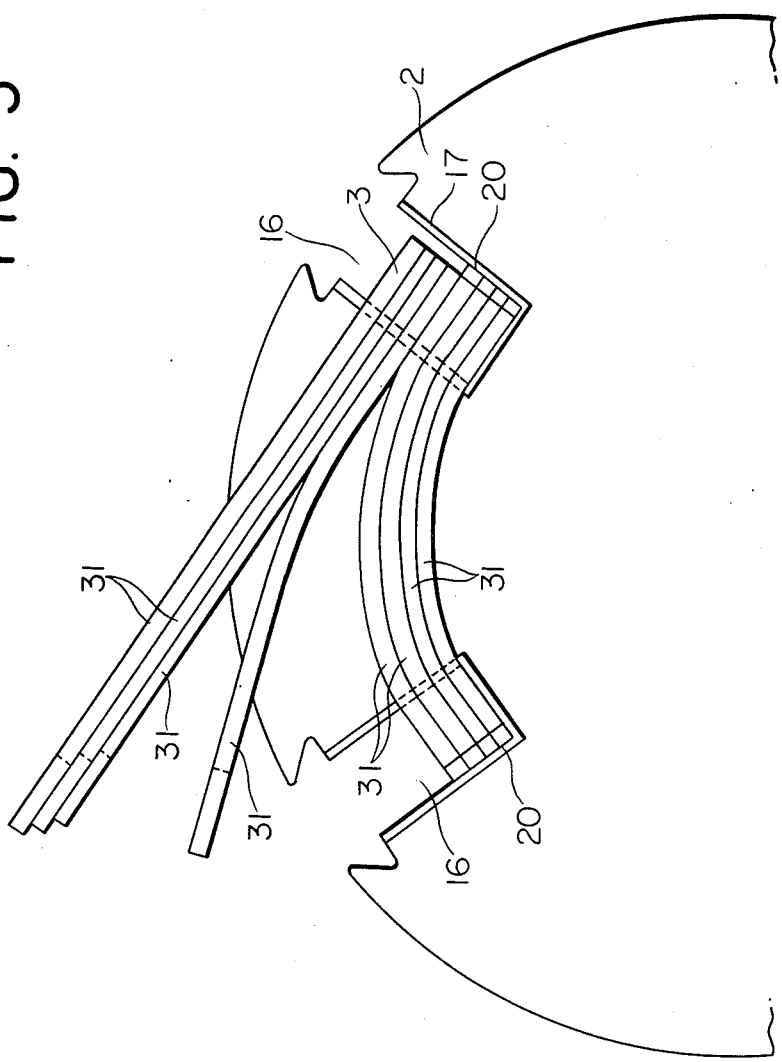

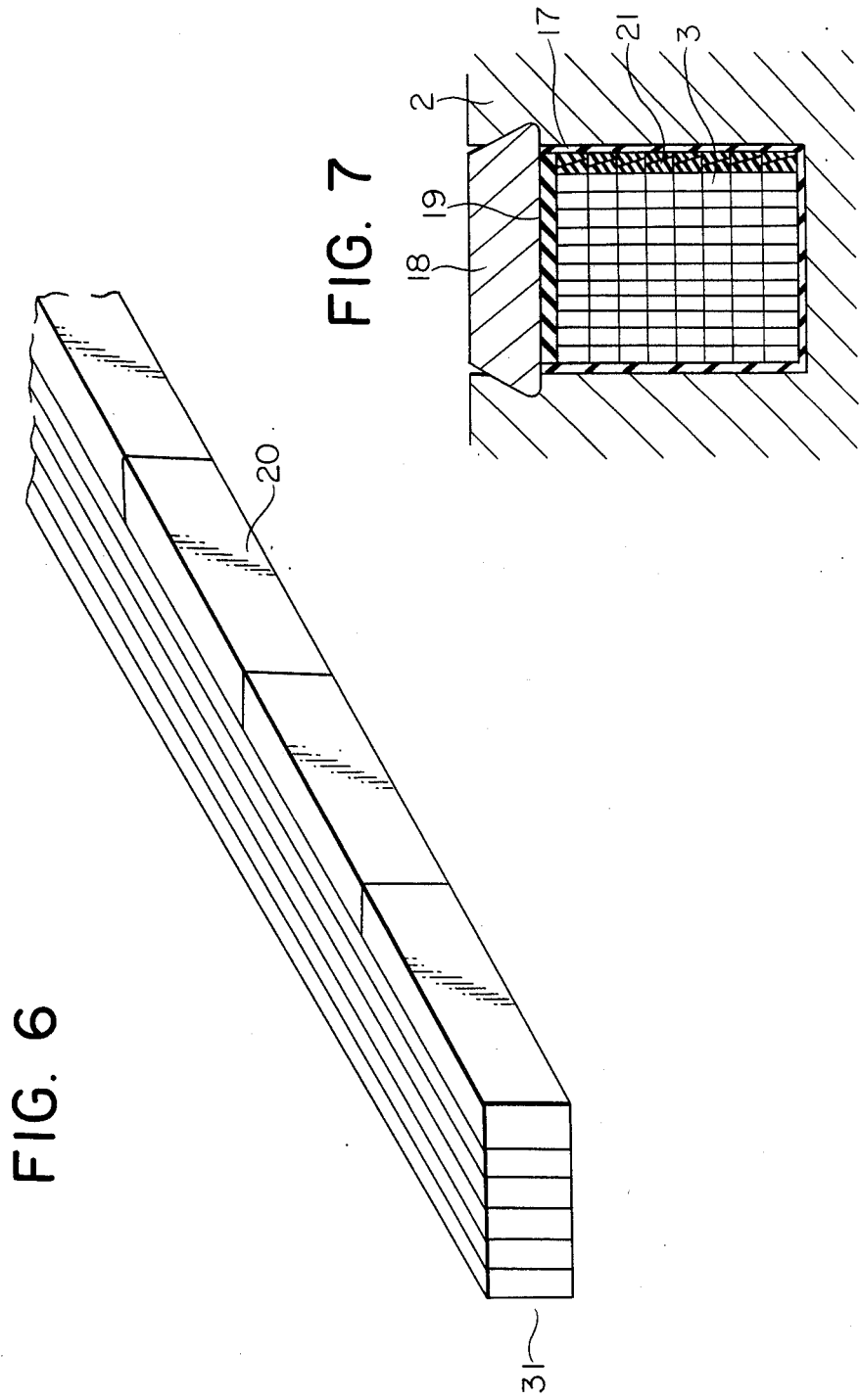

ROTOR FOR A SUPERCONDUCTING ROTATING ELECTRIC MACHINE

This application is a continuation of application Ser. No. 924,876, filed 10/30/86, now abandoned.

BACKGROUND OF THE INVENTION

This invention relates to a rotor for a superconducting rotating electric machine, and in particular to a rotor in which the coils of the rotor winding are reliably restrained against circumferential forces.

In a superconducting rotating electric machine, the rotor winding is subjected to very great forces in the circumferential direction during operation. It is essential that the coils of the winding be restrained from moving under these forces, since the heat of friction generated by any movement may be sufficient to cause a loss of superconductivity.

The conventional method of restraining the coils of a rotor winding against movement is to insert some sort of rigid retaining member, which extends over all or a considerable portion of the depth of each coil, between the sides of the coil and the sides of the coil slot in which the coil is housed. For example, Japanese Laid Open Patent Application No. 57-166838 discloses a rotor for a superconducting rotating electric machine in which the coils of the rotor are restrained by a pair of retaining members such as wedges which are both inserted between one side of a coil and one side of the slot in which the coil is housed, the restraining members extending for the entire depth of the coil. One of the retaining members serves to protect the sides of the coil while the other retaining member is being pounded into the slot. These retaining members can effectively restrain the entire coil, but they are not entirely satisfactory. Namely, if a coil is not uniformly wound with respect to all of its layers, one or more layers of the coil may be able to move inside the slot, even though the coil as a whole is securely restrained. If this layer or layers moves during operation of the rotor, a loss of superconductivity may ensue due to the frictional heat generated by the movement.

SUMMARY OF THE INVENTION

It is an object of the present invention to provide a rotor for a superconducting rotating electric machine whose rotor winding can be reliably restrained against circumferential forces even when there is nonuniformity among the layers of a coil of the winding.

It is another object of the present invention to provide a rotor in which the winding can be easily installed.

A rotor according to the present invention has a cylindrical coil-carrying shaft in which are formed longitudinally-extending slots for housing rotor coils. Each coil is restrained against circumferential forces by a plurality of restraining members which are inserted between one side of a slot and the side of the coil housed therein. The restraining members are disposed on top of one another over the depth of the coil in layers corresponding to the number of layers of the coil. Preferably, a plurality of longitudinally-aligned restraining members are used for each layer of the coil. The restraining members may comprise rectangular prismatic blocks or wedges. The restraining members are preferably made of an electrically-insulating material. The restraining members for a each layer of the coil may be spaced apart from one another in the longitudinal direction with packings inserted in the gaps between the restraining members.

BRIEF DESCRIPTION OF THE DRAWINGS

FIG. 5 is an end view of the coil-carrying shaft of FIG. 2, showing the manner of installing a coil like the one of FIG. 3 in the slots of the shaft.

FIG. 6 is a perspective view of one layer of a coil of a rotor according to the present invention along with the restraining members for restraining this layer against movement in the circumferential direction.

FIG. 7 is a transverse cross-sectional view similar to FIG. 4, showing a portion of a second embodiment of the present invention.

DESCRIPTION OF THE PREFERRED EMBODIMENTS

Hereinbelow, a number of preferred embodiments of a rotor according to the present invention will be described while referring to the accompanying drawings.

Figure 1:
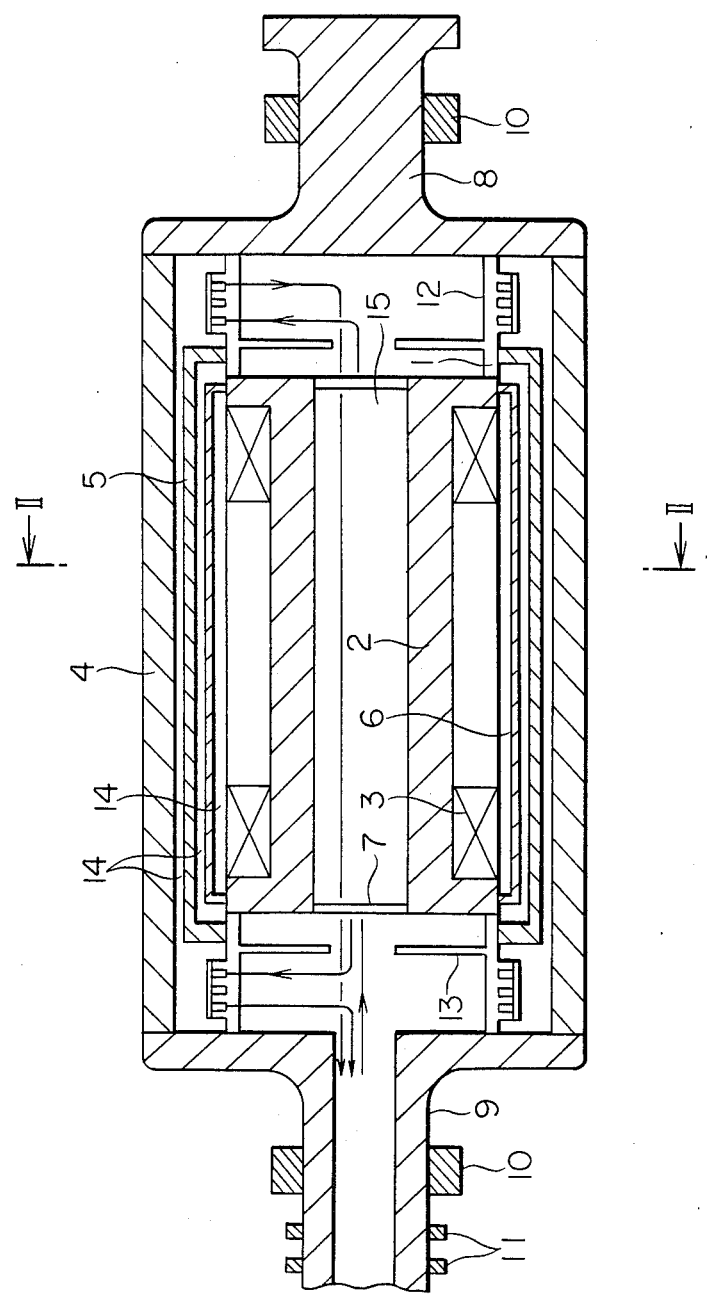
FIG. 1 is a longitudinal cross-sectional view of a first embodiment of a rotor for a superconducting rotating electric machine according to the present invention.

As shown in FIG. 1, which is a longitudinal cross-sectional view of a rotor according to the present invention, the rotor has two cylindrical torque tubes 1 which are rigidly secured to opposite ends of a hollow, cylindrical coil-carrying shaft 2 having a plurality of longitudinally-extending slots in which the coils 3 of a superconducting field winding are mounted. The right torque tube 1 in the figure is rigidly secured to a first end shaft 8, which is drivingly connected to a prime mover or to a load, depending upon whether the rotor is used as part of a generator or a motor, and the left torque tube 1 is rigidly secured to a second end shaft 9. The first end shaft 8 and the second end shaft 9 are rotatably supported by bearings 10. The second end shaft 9 has a number of slip rings 11 mounted thereon through which field current is supplied to the field winding.

The coil-carrying shaft 2 is surrounded by a cylindrical warm damper shield 4 whose opposite ends are secured to the first end shaft 8 and the second end shaft 9. The warm damper shield 4 is at ambient temperature. A cylindrical cold damper shield 5 is disposed between the warm damper shield 4 and the coil-carrying shaft 2 with a longitudinally-extending space left therebetween. The warm damper shield 4 and the cold damper shield 5 act to shield the field winding from high-frequency magnetic fields and to decrease rotor oscillations due to disturbances in the electrical power system to which the rotor is connected. In addition, the warm damper shield 4 forms a vacuum seal between the inside and outside of the rotor, while the cold damper shield 5 also acts as a radiation shield for the inside portion of the coil-carrying shaft 2.

The coil-carrying shaft 2 is surrounded by a helium outer tube 6 which is secured thereto with a space left between the outer surface of the outer tube 6 and the inner surface of the cold damper shield 5. The ends of the coil-carrying shaft 2 are sealed by end plates 7, and the central cavity 15 of the coil-carrying shaft 2 is filled with liquid helium.

Heat exchangers 12 are either mounted on or formed as part of the torque tubes 1. At either end of the coil-carrying shaft 2, lateral radiation shields 13 are provided which protect the field winding from radiation coming from the sides. A vacuum is maintained in the spaces 14 between the warm damper shield 4 and the cold damper shield 5, between the cold damper shield 5 and the helium outer tube 6, and between the helium outer tube 6 and the coil-carrying shaft 2.

Liquid helium is introduced from an unillustrated liquid helium supply system into the central cavity 15 of the coil-carrying shaft 2 through unillustrated pipes which pass through the second end shaft 9. The liquid helium cools the superconducting rotor coils 3 to cryogenic temperatures at which their electrical resistance becomes zero. The direction of flow of the liquid helium through the rotor is indicated by the arrows.

Figure 2:
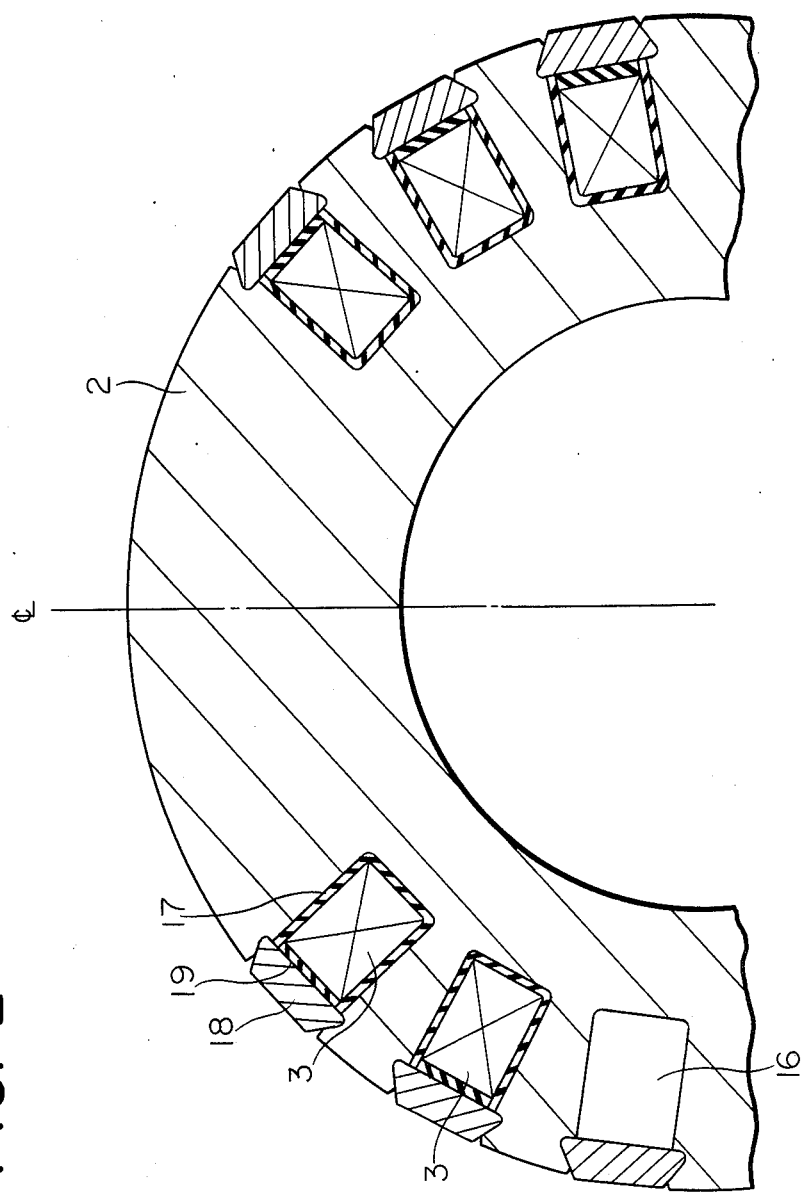
FIG. 2 is a transverse cross-sectional view taken along Line II-II of FIG. 1 of a portion of the coil-carrying shaft of the rotor of FIG. 1.

FIG. 2 is a cross-sectional view taken along Line II—II of FIG. 1, illustrating the structure of the coil-carrying shaft 2 in more detail. The shaft 2 has a plurality of longitudinally-extending slots 16 formed in its outer surface which are symmetric with respect to the centerline of the shaft 2. Each coil 3 is housed in a pair of these slots 16 disposed on opposite sides of the centerline. The sides and bottom surface of each slot 16 are lined with electrical insulation 17, and the coil 3 fits inside the insulation 17. The top surface of each coil 3 is covered by an upper packing 19, and the coil 3 is restrained against radial forces by a wedge 18 which is press-fit into the upper portion of the slot 16.

Figure 3:
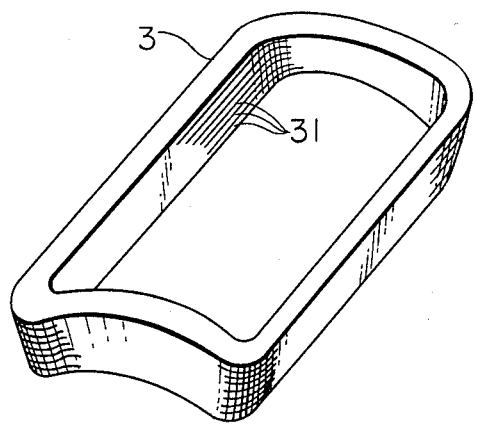
FIG. 3 is a perspective view of a rotor coil for use in the rotor of FIG. 1.

Prior to insertion into the slots 16 in the coil-carrying shaft 2, each coil 3 is wound by a special winding machine. FIG. 3 illustrates such a pre-wound coil 3. It has two parallel longitudinally-extending portions which are connected with one another by a pair of parallel circumferentially-extending portions. The longitudinally-extending portions are housed in the longitudinally-extending slots 16 illustrated in FIG. 2, while the circumferentially-extending portions are housed in unillustrated circumferentially-extending slots which connect the ends of the longitudinally-extending slots 16. Each coil 3 consists of a plurality of layers 31.

Figure 4:
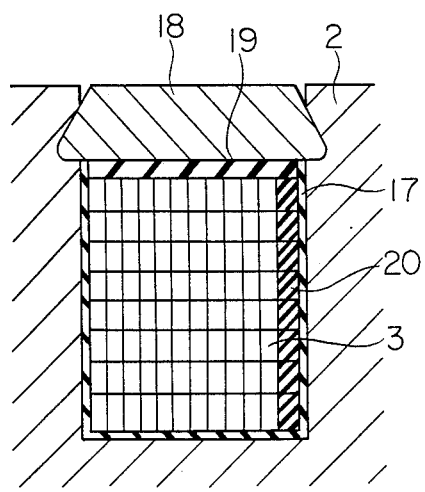
FIG. 4 is an enlarged transverse cross-sectional view of a portion of the coil-carrying shaft of FIG. 2, showing the inside of one slot for a coil.

FIG. 4 is a more detailed transverse cross-sectional view of a portion of the coil-carrying shaft 2 of FIG. 2, showing the inside of one of the slots 16 in which one of the longitudinally-extending portions of a coil 3 are disposed. On one side of the slot 16, between the electrical insulation 17 and the coil 3, are provided a plurality of restraining members 20 for restraining the coil 3 against forces in the circumferential direction. The restraining members 20 are stacked on top of one another over the entire depth of the coil 3 in layers corresponding to the number of layers 31 of the coil 3. The restraining members 20 comprise rectangular prismatic blocks of a rigid material. In order to prevent the restraining members 20 from short-circuiting the coil 3, they are preferably made of an electrically-insulating material such as a conventionally-used epoxy-glass laminate.

FIG. 5 illustrates the installation of a pre-wound coil 3 such as the one shown in FIG. 3 in the coil-carrying shaft 2. One of the longitudinally-extending portions of a coil 3 is inserted into a first slot 16 on the right side of the figure, and the other side of the coil 3 is then inserted one layer at a time into a second slot 16 on the left side of the figure. As each layer 31 of the coil 3 is disposed in the slots 16, restraining members 20 are pounded with a hammer into the spaces between the outer sides of the layer 31 which was just inserted and the electrical insulation 17 lining the walls of the slots 16. When inserted, each restraining member 20 exerts a compressive force on the side of the layer 31, preventing it from moving in the circumferential direction.

Since each layer 31 of the coil 3 is individually restrained by corresponding restraining members 20 independently of the adjoining layers 31, it does not matter if there is non-uniformity among the layers 31 of a coil 3, and each layer 31 can be reliably prevented from moving in the circumferential direction. Therefore, during operation of a superconducting rotating electric machine employing a rotor according to the present invention, there is no danger of the coils 3 moving due to circumferential forces and generating frictional heat which could cause a loss of superconductivity.

Furthermore, because the restraining members 20 extend for only the height of a single layer 31 of the coil 3, the force required to insert a restraining member 20 is small and they can be easily inserted. The possibility of injuring the coil 3 when inserting the restraining members 20 is also reduced.

It is possible for each restraining member 20 to extend for the entire length of a slot 16, but preferably a plurality of shorter, longitudinally-aligned restraining members 20 are used for each layer. Such a structure is illustrated in FIG. 6, which is a perspective view of a single layer 31 of a coil 3 and the restraining members 20 for that layer 31. Short restraining members 20 have the advantage that they can be more easily installed in the slots 16.

Figure 8:
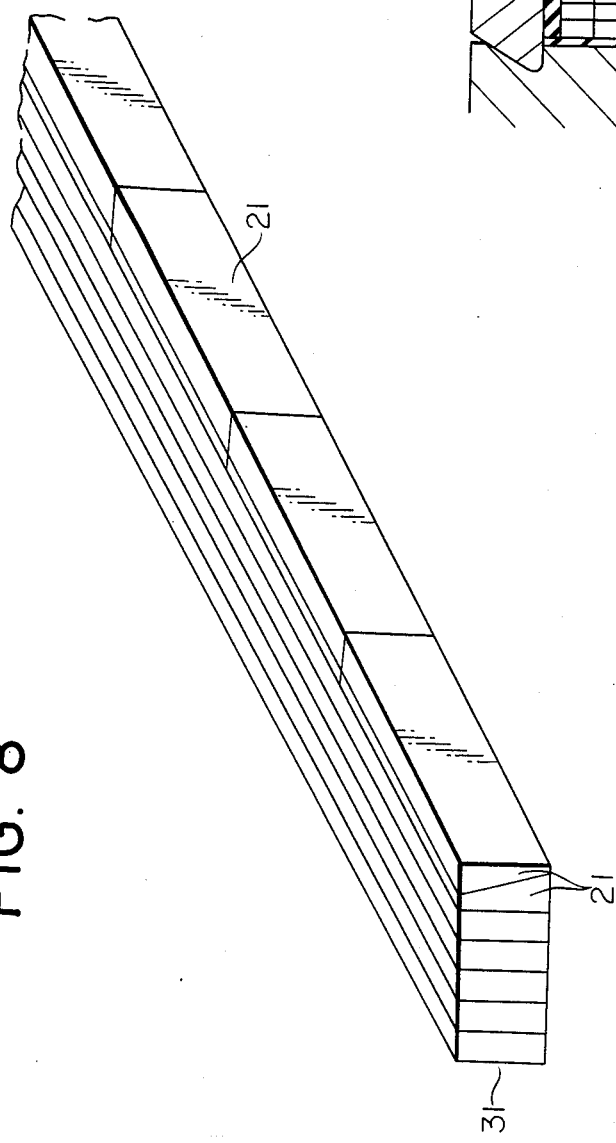
FIG. 8 is a perspective view similar to FIG. 6, showing one layer of a coil according to the embodiment of FIG. 7.

FIG. 7 is a cross-sectional view of a portion of a second embodiment of a rotor according to the present invention. As in the previous embodiment, a plurality of restraining members 21 equal in number to the number of layers 31 of a coil are provided between one side of the coil 3 and electrical insulation 17 along one side of a slot 16. In this second embodiment, each of the restraining members 21 consists of a pair of wedges. Preferably, the restraining members 21 are made of an electrically-insulating material such as an epoxy-glass laminate so as to prevent the short-circuiting of the coil 3. The manner of installation is similar to that illustrated in FIG. 5, the restraining members 21 being inserted one layer at a time over the depth of the coil 3. The structure of this embodiment is otherwise identical to that of the first embodiment. As shown in FIG. 8, which is a perspective view of one layer of the coil 3 of FIG. 7, the restraining members 21 are preferably divided in the longitudinal direction into a plurality of short segments so that they can be more easily inserted into the slots 16.

This embodiment provides the same effects as the first embodiment.

Since the force required to insert the restraining members 21 is low, the chances of damaging the coil 3 during insertion are small, and it is also possible for each restraining member 21 to comprise only a single wedge instead of two.

Figure 9:
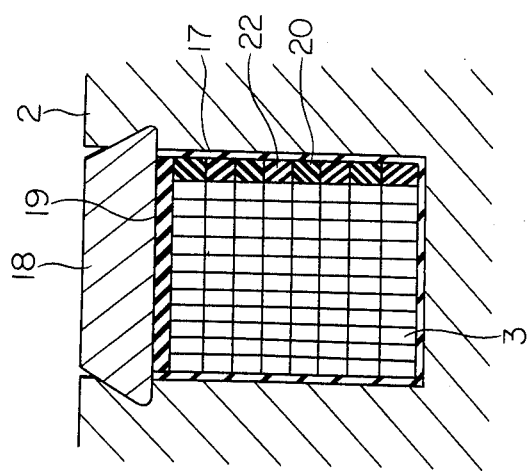
FIG. 9 is a transverse cross-sectional view of a portion of a third embodiment of the present invention.
Figure 10:
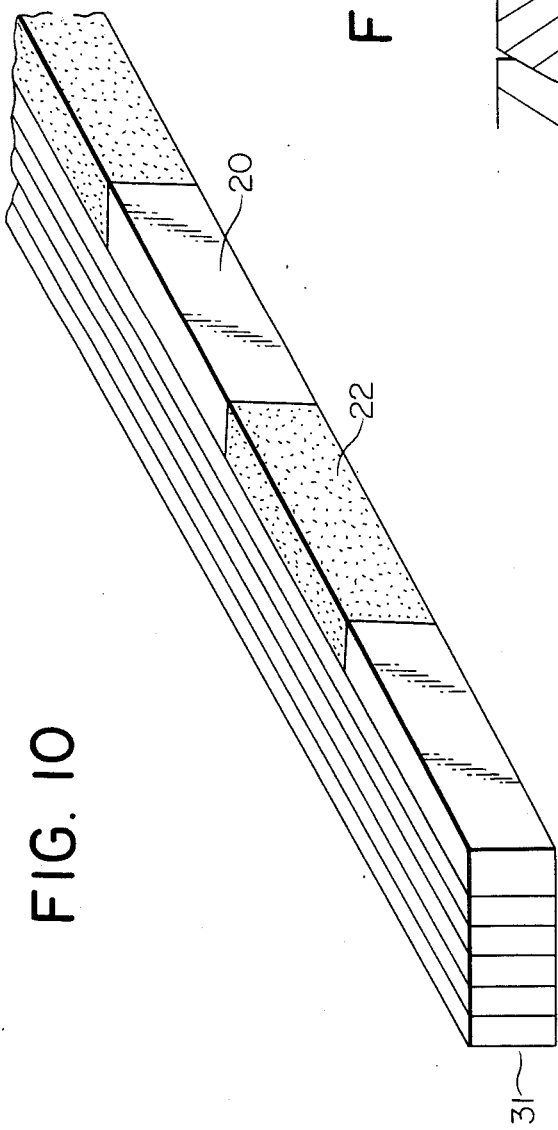
FIG. 10 is a perspective view of one layer of a coil according to the embodiment of FIG. 9.

FIGS. 9 and 10 illustrate a third embodiment of a rotor according to the present invention. The overall structure of this embodiment is the same as that of the first embodiment, and as in that embodiment, the restraining members 20 for the rotor coil 3 consist of rectangular, prismatic blocks of a rigid, electrically-insulating material. However, in this embodiment, the restraining members 20 for a single layer 31 of the coil 3 are disposed with gaps therebetween in the longitudinal direction, and packings 22 are inserted in the gaps so as to completely fill them. The packings 22 are preferably made of a material which is flexible at the time of installation and becomes more rigid with the passage of time. A suitable material for the packings 22 is pieces of felt impregnated with a resin.

The method of installing a coil 3 in a rotor according to this embodiment is similar to that of the first embodiment. A pre-wound coil 3 is inserted into a pair of slots 16 in the coil-carrying shaft 2 one layer at a time, and after each layer is inserted, the restraining members 20 are pounded into the slot 16 between one side of the layer 31 and the electrical insulation 17 lining the slot 16, with gaps left between the restraining members 20 in the longitudinal direction. The packings 22 are then inserted into the gaps between the restraining members 20.

The embodiment provides the same effects as the previous two embodiments.

Figure 11:
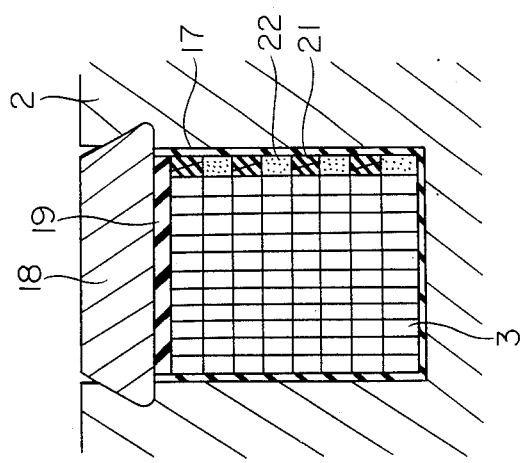
FIG. 11 is a transverse cross-sectional view of a portion of a fourth embodiment of the present invention.
Figure 12:
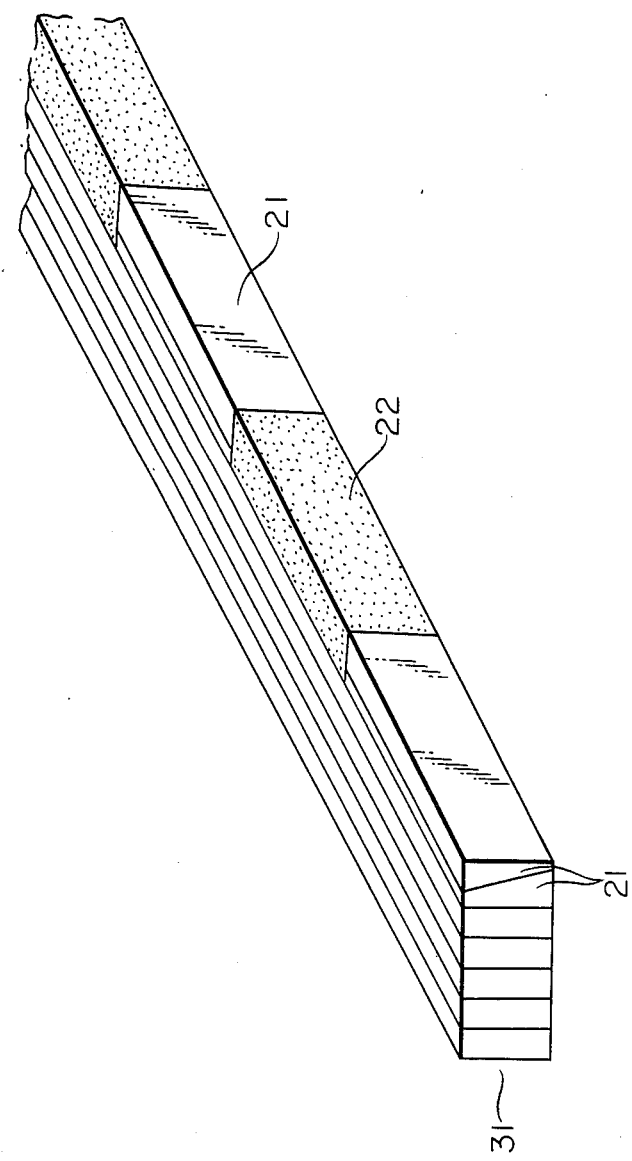
FIG. 12 is a perspective view of one layer of a coil according to the embodiment of FIG. 11. In all of the drawings, the same reference numerals indicate the same or corresponding parts.

FIGS. 11 and 12 illustrate a fourth embodiment of the present invention which has the same basic structure as the third embodiment but differs in that each restraining member 21 comprises a pair of wedges. Gaps are left between the restraining members 21 in the longitudinal direction, and packings 22 are inserted into the gaps. When installing a coil 3 in the slots 16 of a coil-carrying shaft 2 of a rotor according to this embodiment, the layers 31 of a pre-wound coil 3 are inserted into a pair of slots 16 one at a time, and after a layer is inserted, the wedges for restraining that layer are pounded into the slot 16, and packings 22 are then inserted into the longitudinal gaps between the restraining members 21. This embodiment provides the same effects as the previous embodiments. Although each of the restraining members 21 is shown comprising two wedges, as the force required for insertion is small, it is possible for a restraining member 21 to comprise only a single wedge.

What is claimed is:

1. A rotor for a superconducting rotating electric machine comprising:
   a cylindrical coil-carrying shaft having a plurality of longitudinally-extending slots for coils formed therein:
   a plurality of rotor coils each having a plurality of layers and two parallel longitudinally-extending portions, each of said longitudinally-extending portions being disposed in one of said slots; and
   a plurality of restraining members which are press-fit into each slot in the longitudinal direction of the slot between one side of the slot and the side of the coil disposed therein, said restraining members being disposed on top of one another for the depth of the coil in layers corresponding to the number of layers of the coil.

2. A rotor as claimed in claim 1, wherein each layer of said restraining members comprises a plurality of said restraining members which are aligned in the longitudinal direction of said coil-carrying shaft.

3. A rotor as claimed in claim 2, wherein:
   gaps are provided in the longitudinal direction between the restraining members in each layer of restraining members; and
   said rotor further comprises packings which are inserted into said gaps.

4. A rotor as claimed in claim 3, wherein said packings comprise a material which is flexible at the time of installation and which hardens with time.

5. A rotor as claimed in claim 4, wherein said packings are made of felt impregnated with a resin.

6. A rotor as claimed in claim 1, wherein each of said restraining members comprises a prismatic block of a rigid material.

7. A rotor as claimed in claim 1, wherein each of said restraining members comprises at least one wedge.

8. A rotor as claimed in claim 1, wherein said restraining members comprise an electrically-insulating material.

* * * * *